United States Patent
Andreoli-Fang et al.

(10) Patent No.: US 12,273,213 B1
(45) Date of Patent: Apr. 8, 2025

(54) DTP CALIBRATION PLATFORM

(71) Applicant: Cable Television Laboratories, Inc., Louisville, CO (US)

(72) Inventors: Jennifer Andreoli-Fang, Boulder, CO (US); Mark J. Poletti, Louisville, CO (US); Rahil Gandotra, Boulder, CO (US); Ruoyu Sun, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 408 days.

(21) Appl. No.: 17/894,952

(22) Filed: Aug. 24, 2022

Related U.S. Application Data

(60) Provisional application No. 63/272,826, filed on Oct. 28, 2021, provisional application No. 63/236,326, filed on Aug. 24, 2021.

(51) Int. Cl.
*H04L 12/28* (2006.01)
*H04J 3/06* (2006.01)

(52) U.S. Cl.
CPC ........ *H04L 12/2801* (2013.01); *H04J 3/0661* (2013.01)

(58) Field of Classification Search
CPC .......................... H04L 12/2801; H04J 3/0661
See application file for complete search history.

(56) References Cited

U.S. PATENT DOCUMENTS

2012/0300859 A1* 11/2012 Chapman ............... H04J 3/0664 375/257
2022/0263677 A1* 8/2022 Neugeboren ...... H04N 21/6118

OTHER PUBLICATIONS

John T. Chapman, Rakesh Chopra, Laurent Montini., "The DOCSIS® Timing Protocol (DTP), Generating Precision Timing Services from a DOCSIS System," INTX/SCTE Spring Technical Forum, 2011.
Cable Television Laboratories, Inc., "Docsis® Mac and Upper Layer Protocols Interface Specification", CM-SP-MULPI, Dec. 2020.
Cable Television Laboratories, Inc., "Synchronization Techniques for DOCSIS® Technology Specification," CM-SP-SYNC, Apr. 2021.
Elias Chavarria Reyes, John T. Chapman, "How the DOCSIS Time Protocol makes the SYNC Specification Tick," SCTE Cable-Tec Expo Fall Technical Forum, Denver, Oct. 2020.
Ruoyu Sun, Jennifer Andreoli-Fang, Elias Chavarria Reyes, John T. Chapman, et al., "DOCSIS Time Protocol Proof of Concept," in SCTE-Expo 2021, Atlanta, GA, Oct. 11-14, 2021.

(Continued)

*Primary Examiner* — Duc C Ho
(74) *Attorney, Agent, or Firm* — Cozen O'Connor

(57) ABSTRACT

Systems and methods implement Data-Over-Cable Service Interface Specification (DOCSIS) time protocol (DTP) calibration. A testing laboratory measures a DTP timing error for a test configuration representative of a DOCSIS network to determine DTP calibration data. The DTP calibration data is stored in association with a DTP calibration testing setup of the DOCSIS network in a DTP calibration platform. An operational cable modem termination system (CMTS) conforming to the DTP calibration testing setup retrieves and applies the DTP calibration data from the DTP calibration platform based on the DTP calibration testing setup.

19 Claims, 12 Drawing Sheets

(56) References Cited

OTHER PUBLICATIONS

Cable Television Laboratories, Inc., "DOCSIS Time Protocol Proof of Concept Phase I Technical Report CM-TR-DTP-D01-210831," to be published, 2021.
M. A. Kamal, H. W. Raza, M. M. Alam, and M. M. Su'ud, "Highlight the features of AWS, GCP and Microsoft Azure that have an impact when choosing a cloud service provider," International Journal of Recent Technology and Engineering (IJRTE), vol. 8, No. 5, Jan. 2020.

* cited by examiner

DTP CALIBRATION PLATFORM

RELATED APPLICATIONS

This application claims priority to U.S. Patent Application No. 63/236,326, titled "Cloud-Based DTP Calibration Database," filed Aug. 24, 2021, and to U.S. Patent Application No. 63/272,826, titled "Cloud-Based DTP Calibration Database," filed Oct. 28, 2021, both of which are incorporated herein in their entirety by reference.

BACKGROUND

Mobile networks, such as the 4G/5G cellular networks, require a high-accuracy synchronization source in the backhaul, mid-haul or fronthaul (collectively referred to as "mobile Xhaul") where the GPS signals are unreliable. When correctly calibrated, the DOCSIS Timing Protocol (DTP) provides such sync signals in the Xhaul over Hybrid Fiber Coax (HFC) networks; however, such calibration cannot be performed for each individual devices, e.g., the cable modem (CM), cable modem termination system (CMTS), remote-PHY device (RPD) or remote-MAC-PHY device (RMD). Without calibration, the accuracy of the sync signals in the Xhaul over HFC networks is insufficient.

SUMMARY

One aspect of the present embodiments includes the realization that DTP needs automated calibration in the field to guarantee accurate time delivery to a base station that is unable to receive reliable GPS signals. The present embodiments solve this problem by providing a DTP calibration method that includes a DTP calibration platform (e.g., a cloud app running on a cloud-based server) for making the calibration data readily available to DTP enabled components. A modular application design leverages various cloud benefits such as abstraction, automation, and high-availability. A web GUI (implemented in Python using Flask, for example) allows an engineer to add, read, and delete DTP calibration data entries from the DTP calibration platform. The DTP calibration platform includes an API that uses HTTP protocol with JSON as the data format for a calibration data message flow. Security and reliability enhancement features may be included as needed. In certain embodiments, uploading of calibration data to the DTP calibration platform is automated. Each CMTS with DTP capability adds a feature to request and receive calibration data automatically.

In one embodiment, a cloud-based Data-Over-Cable Service Interface Specification (DOCSIS) time protocol (DTP) calibration method includes: receiving, at a DTP calibration platform from a cable modem termination system (CMTS), a request including a DTP calibration testing setup defining (a) a network architecture and (b) hardware and firmware configuration of DTP capable components of a DOCSIS network; retrieving, from the DTP calibration platform and based on the DTP calibration testing setup, associated DTP calibration data that includes an additional time adjustment y for calibrating DTP between the CMTS and a cable modem (CM) of the DOCSIS network; and sending the associated DTP calibration data to the CMTS.

In another embodiment, a cloud-based Data-Over-Cable Service Interface Specification (DOCSIS) time protocol (DTP) calibration method includes: determining, at a cable modem termination system (CMTS), a DTP calibration testing setup of a DOCSIS network, the DTP calibration testing setup defining (a) a network architecture and (b) hardware and firmware configuration of DTP capable components of a DOCSIS network; sending a request including the DTP calibration testing setup to a DTP calibration platform; receiving, from the DTP calibration platform based on the DTP calibration testing setup, DTP calibration data including an additional time adjustment y; and sending the additional time adjustment y to a cable modem (CM) of the DOCSIS network, wherein the additional time adjustment y calibrates DTP between the CMTS and the CM.

In another embodiment, a Data-Over-Cable Service Interface Specification (DOCSIS) time protocol (DTP) calibration data platform, includes: a calibration data repository storing DTP calibration data in association with a DTP calibration testing setup defining (a) a network architecture and (b) hardware and firmware configuration of DTP capable components of a DOCSIS network; an application programming interface (API) having an API framework responsive to send DTP calibration data to a cable modem termination system (CMTS) in response to a request defining the DTP calibration testing setup of the DOCSIS network; and a graphical user interface (GUI) providing a means for updating the calibration data repository.

In another embodiment, a Data-Over-Cable Service Interface Specification (DOCSIS) time protocol (DTP) calibration method includes: measuring, in a testing laboratory, a DTP timing error for a test configuration representative of a DOCSIS network to determine DTP calibration data; storing the DTP calibration data in association with a DTP calibration testing setup of the DOCSIS network in a DTP calibration platform; and applying, by an operational cable modem termination system (CMTS) conforming to the DTP calibration testing setup, the DTP calibration data retrieved from the DTP calibration platform based on the DTP calibration testing setup.

DETAILED DESCRIPTION OF THE EMBODIMENTS

Figure 1:
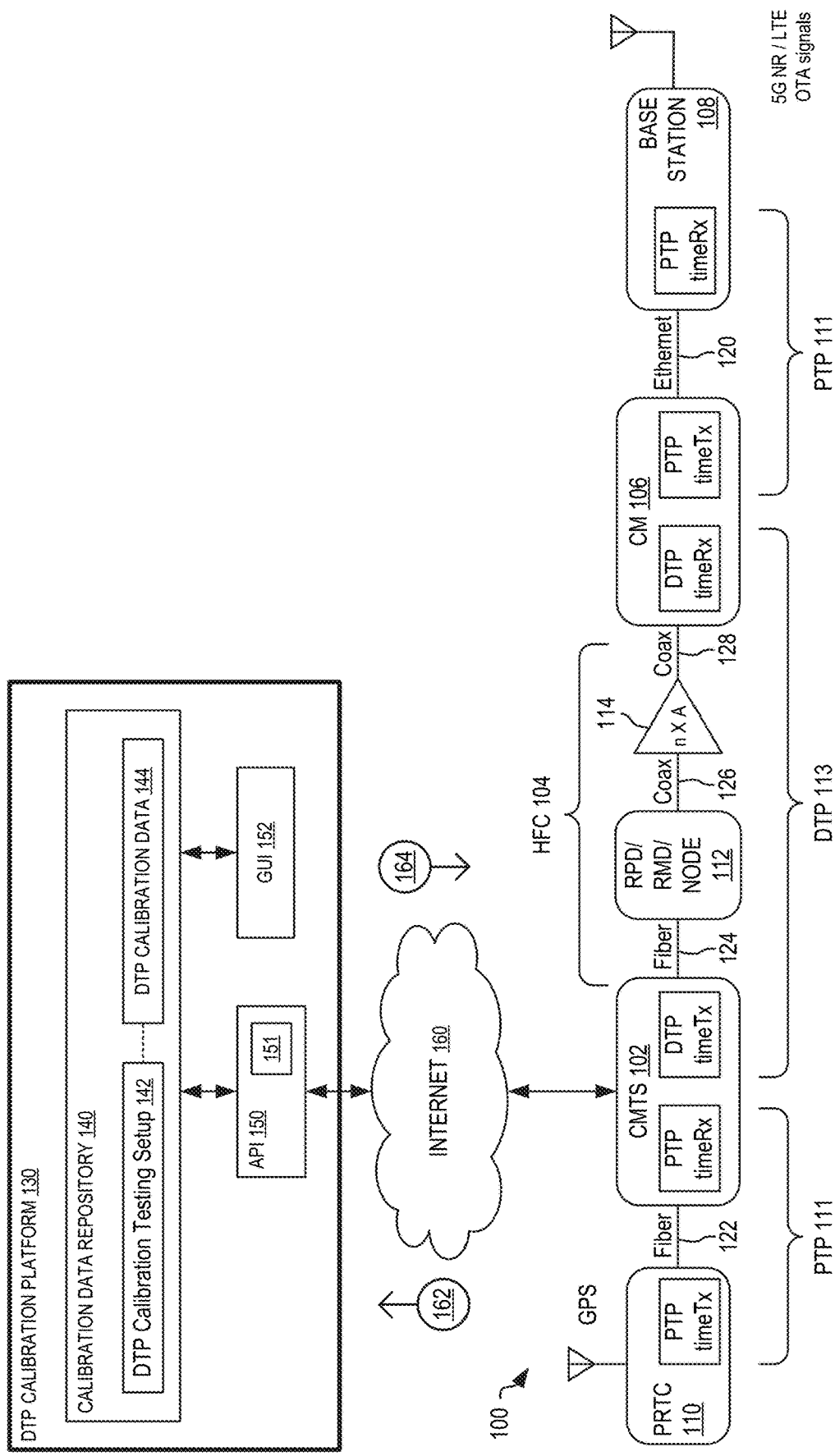
FIG. 1 is a block diagram illustrating one example DOCSIS network with a DTP calibration platform, in embodiments.

A time division duplex (TDD), for example utilized by 3GPP defined protocols such as 6G, 5G or Long-Term Evolution (LTE) base station requires a timing signal (e.g., a timestamp) with an error of less than, for example, 1.5 µs. Base stations may obtain this timing signal, using a Precision Time Protocol (PTP), from a Primary Reference Time Clock (PRTC) that determines accurate timing by receiving a GPS signal. However, when the base station cannot receive the reliable GPS signal (e.g., when not located in a GPS reception area such as within a building), the timing signal must be received from a remote source. For example, small-cell and femtocell 5G base stations that are deployed indoors may not be able to accurately rely on GPS signals. Further, PTP operates poorly over a coaxial link because it is handled as data traffic, and thus cannot be used over a hybrid fiber-coaxial (HFC) plant to reliably provide a timing signal.

A Data-Over-Cable Service Interface Specification (DOCSIS) Time Protocol (DTP) was created in 2011 by John Chapman of Cisco in anticipation of using the DOCSIS network to provide timing as a service (TaaS) (e.g., to a base station or other device requiring an accurate timing signal) and was standardized as part of DOCSIS 3.1. The primary use case for DTP is mobile backhaul over DOCSIS, and, therefore, CableLabs introduced the SYNC specification in 2020 addressing this specific use case. As part of the SYNC specification initiative, Elias Chavarria and John Chapman from Cisco redesigned the DTP algorithm to bypass a set of limiting assumptions in the original DTP design. (See Elias Chavarria Reyes, John T. Chapman, "How the DOCSIS Time Protocol makes the SYNC Specification Tick," SCTE Cable-Tec Expo Fall Technical Forum, Denver, October 2020, incorporated herein by reference.) In 2020, a group of companies, including CableLabs, Charter, Cisco and Hitron, also did a proof of concept (PoC) to validate the performance of DTP. The test results of the proof of concept are reported in a separate Society of Cable Telecommunications Engineers (SCTE) paper and a CableLabs technical report. (See Ruoyu Sun, Jennifer Andreoli-Fang, Elias Chavarria Reyes, John T. Chapman, et al., "DOCSIS Time Protocol Proof of Concept," in SCTE-Expo 2021, Atlanta, GA, Oct. 11-14, 2021, incorporated herein by reference.)

DTP allows a DOCSIS network to deliver native timing and frequency for use by remotely located timing protocols by establishing a set of techniques and DOCSIS signaling messages between a cable modem termination system (CMTS) and a cable modem (CM). In the original DTP design, the DTP messages contained CM and CMTS timing parameters, making an assumption that CM timing parameters could be measured separately from CMTS timing parameters before deployment. The timing parameters in the CMTS and CM would have been scalable in this distributed measurement model. For the assumption to be valid, a testing device capable of separately measuring the CMTS and CM timing parameters is required; however, no such testing device exists. Therefore, the usability of the original DTP design was limited, and DTP was redesigned as part of the SYNC specification effort, described above.

In the redesigned DTP, the timing parameters are no longer measured separately for the CM and the CMTS, they are instead measured jointly (e.g., a single DTP timing parameter), allowing use of existing testing devices in the market. A consequence of this change is that the number of measurements grows from linear to exponential. Where n represents a number of CMTS products and m represents number of CM products that support DTP, the original DTP design required n+m measurements of timing parameters. The redesigned DTP requires n*m measurements of DTP timing parameters to account for the different permutations of device connection.

The value of the DTP timing parameter may also depend on the CMTS and CM configuration (e.g., the DS cyclic prefix configuration). For example, w represents a number of different DS cyclic prefix configurations, the number of measurements of DTP timing parameters grows to n*m*w.

One aspect of the present embodiments includes the realization that the cable industry has two options to handle the measurement, storage, update, and accessibility of all the DTP timing parameters. One option is for every CM and CMTS vendor to do perform these measurements by itself, leading to a replication of effort and resource investments with little added value for the vendors. A second option is for a common entity, such as CableLabs, to lead the measurement, storage, update, and accessibility of all DTP timing parameters. The present embodiments solve these problems by implementing a cloud application that allows the cable ecosystem—both vendors and operators—to leverage a shared pool of resources.

FIG. 1 is a block diagram illustrating one example DOCSIS network 100 with a DTP calibration platform 130. DOCSIS network 100 includes a CMTS 102, an HFC plant 104, and a CM 106 located at a base station 108. A primary reference time clock (PRTC) 110 receives a GPS signal and provides a timestamp to CMTS 102 using PTP 111 over a fiber link 122. CMTS 102 may use PTP 111 to distribute the timestamp to other devices over fiber links; however, PTP over HFC plant 104 is unreliable (e.g., not meeting the <1.5 µs error requirement of base station) and therefore CMTS 102 cannot use PTP to send the timestamp to base station 108, instead using DTP 113. As shown, HFC plant 104 includes a fiber link 124, and two coaxial links 126 and 128. Thus, PTP 111 could be used over fiber link 124 to a remote physical layer device (RPD)/remote MAC later device (RMD) node 112, but would become unreliable over coaxial link 126, through amplifier 114, and over coaxial link 128. Accordingly, CMTS 102 uses DTP 113 over HFC plant 104 to deliver an accurate timestamp to CM 106, from where PTP 111 is used over ethernet 120 to deliver the timestamp from CM 106 to base station 108. However, DTP 113 cannot reliably deliver a timestamp with a timing error less than 1.5 µs without calibration.

DTP calibration platform 130 includes a calibration data repository 140, an application programming interface (API) 150, and a graphical user interface (GUI) 152. DTP calibration platform 130 is accessed via internet 160. Calibration data repository 140 stores a DTP calibration testing setup 142 in association with DTP calibration data 144, described in further detail below with reference to FIG. 8. API 150 is defined by an API framework 151 to provide a machine interface for CMTS 102 to fetch DTP calibration data 144 from calibration data repository 140 based on DTP calibration testing setup 142. GUI 152 provides an interface (e.g., human operated by a lab engineer) to add, read, and delete DTP calibration data 144 within calibration data repository 140.

Figure 2:
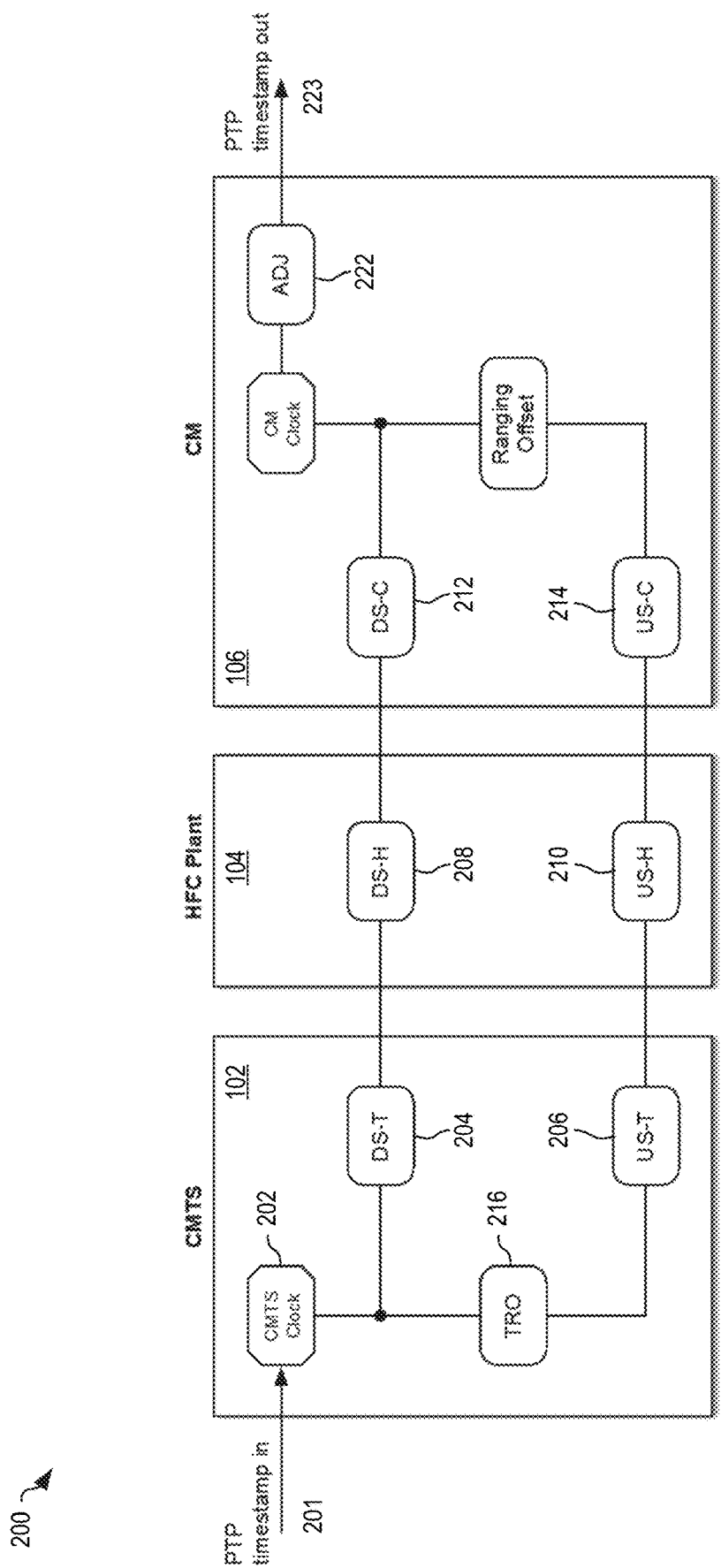
FIG. 2 shows one example DTP timing diagram illustrating downstream (DS) delays and upstream (US) delays in components of DOCSIS network of FIG. 1, in embodiments.

FIG. 2 shows one example DTP timing diagram 200 illustrating downstream (DS) delays and upstream (US) delays in components of DOCSIS network 100 of FIG. 1. CMTS 102 includes a CTS clock 202 that is set according to a timestamp 201 (also referred to as DOCSIS 3.1 timestamp) received via PTP 111 (e.g., from PRTC 110). DS-T 204 and US-T 206 represent DS and US delays caused by CMTS 102, DS-H 208 and US-H 210 represent DS and US delays caused by HFC plant 104, and DS-C 212 and US-C 214 represent DS and US delays caused by CM 106. Accordingly, the timestamp sent by CMTS 102 is delayed before arriving at CM 106. In other words, the timestamp that arrives at CM 106 represents an early version of the CMTS timestamp. The time error (TE) in the timestamp results from only DS delays. Ideally, DS-T 204, DS-H 208, and DS-C 212 should be measured separately and used by DTP 113. However, DOCSIS does not provide reference points for independently measuring these delays. DTP provides a practical way to calibrate the DOCSIS 3.1 timestamp using a true ranging offset (TRO) 216.

Figure 3:
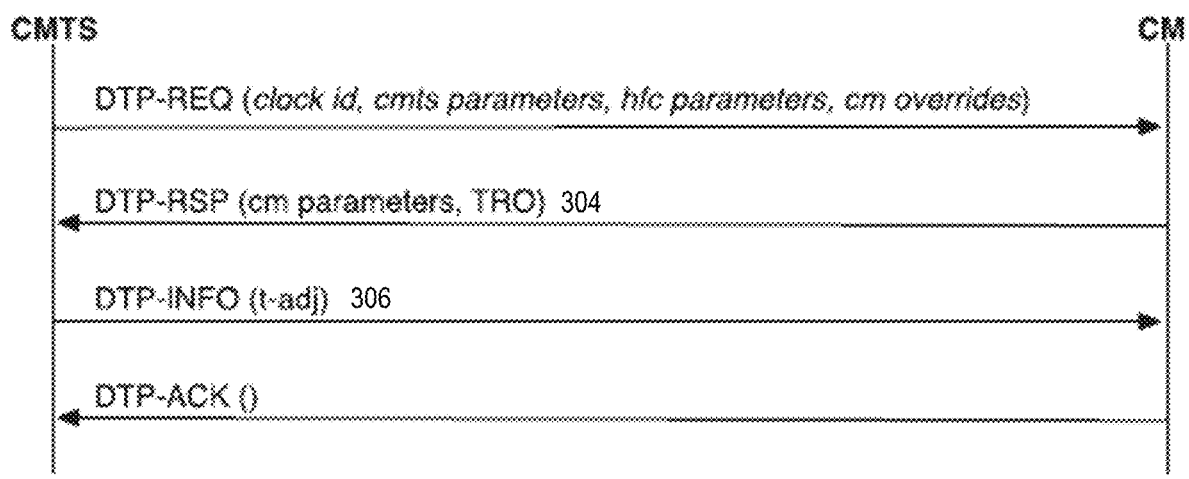
FIG. 3 shows example DTP messages exchanged between CMTS and CM when CMTS is the DTP timeTx and the CM is the DTP timeRx, in embodiments.

FIG. 3 shows example DTP messages exchanged between CMTS 102 and CM 106 when CMTS is the DTP timeTx and the CM is the DTP timeRx. CM 106 measures the round-trip delay as TRO and reports the TRO to CMTS 102 in DTP-Response message 304, shown as TRO 216 in CMTS 102 of FIG. 2. CMTS 102 sends a time adjustment t-adj, or t-cm-adj, to CM 106 in DTP-Info message 306, where the t-cm-adj is approximately equal to half of TRO 216. A timestamp out 223 from CM 106 over its CM to CPE interface (CMCI) ports is equal to timestamp 201 plus t-cm-adj. Within CM 106, and adjustor 222 uses the t-cm-adj to correct the time error cause by delays in the network. Note that this approach assumes that the propagation delay through coaxial cable and fiber is symmetrical.

Where t-cm-adj is set to be half of the TRO, t-cm-adj cannot correct asymmetrical delay (DS delay is different from the US delay). However, this asymmetrical delay is introduced by devices like CMTS, CM, remote RPD and RMD, and any HFC 104 elements. Accordingly, to correct for asymmetrical delays, further calibration of the DOCSIS network 100 is required and this asymmetrical delay needs to be measured in a lab for each combination of CMTS, RPD/RMD and CM. The measured asymmetrical delay could be applied at the CMTS. For example, the following method is supported by the Cisco integrated CMTS (I-CMTS) cBR-8:

$$t\text{-}cm\text{-}adj = t\text{-}tro/2 + y, \quad (1)$$

where y is an additional time adjustment that applies in the CMTS to calibrate the DS delay in the DOCSIS 3.1 timestamp. (See method 2 in Section 5.4 of Cable Television Laboratories, Inc., "DOCSIS Time Protocol Proof of Concept Phase I Technical Report CM-TR-DTP-V01-210915," September, 2021.) The location of CM 106, the length of HFC plant 104, and other symmetrical timing errors are resolved by TRO 216. The asymmetrical timing error is addressed by the additional time adjustment y. This additional time adjustment y is mapped to formula (18) in the SYNC spec, reproduced as formula (2) below:

$$t\text{-}cm\text{-}adj = t\text{-}cm\text{-}adj\text{-}R + [t\text{-}tro + t\text{-}hfc\text{-}ds\text{-}o - t\text{-}hfc\text{-}us\text{-}o - t\text{-}tro\text{-}R]/2, \quad (2)$$

where t-cm-adj is the live time adjustment that the CMTS sends to the CM, while t-cm-adj-R is the value of the DTP time adjustment used in the calibration test that brings the average PTP two-way time error to zero. Similarly, t-tro is the live TRO measured by CM 106 and sent to CMTS 102. t-tro-R is the TRO reported by CM 106 in the lab calibration test. t-hfc-ds-o and t-hfc-ds-o represent any fixed delay elements in HFC plant 104 that contribute to delay, in DS and US, respectively. t-hfc-ds-o and t-hfc-ds-o are provided by CMTS 102 to CM 106. The above formula rearranges as:

$$t\text{-}cm\text{-}adj = t\text{-}tro/2 + [t\text{-}cm\text{-}adj\text{-}R + t\text{-}hfc\text{-}ds\text{-}o/2 - t\text{-}hfc\text{-}us\text{-}o/2 - t\text{-}tro\text{-}R/2], \quad (3)$$

Comparing Eq. (3) to Eq. (1), we get that:

$$y = t\text{-}cm\text{-}adj\text{-}R + t\text{-}hfc\text{-}ds\text{-}o/2 - t\text{-}hfc\text{-}us\text{-}o/2 - t\text{-}tro\text{-}R/2. \quad (4)$$

Note that if HFC plant 104 is assumed to introduce no asymmetry, i.e., t-hfc-ds-o/2=t-hfc-us-o/2, then Eq. (4) is further simplified as:

$$y = t\text{-}cm\text{-}adj\text{-}R - t\text{-}tro\text{-}R/2. \quad (5)$$

Eq. (5) captures the asymmetry in the reference-length plant (see Section 6.4.1.1 in the SYNC spec) introduced jointly by the I-CMTS and CM 106 (in an I-CMTS architecture), or jointly by RPD 112 and CM 106 (in an R-PHY architecture). In DTP calibration, the values for t-cm-adj-R and t-tro-R that make the average PTP two-way time error to zero are measured in the lab and the additional time adjustment y is distributed to CMTS 102. t-tro and t-cm-adj in Eq. (1) are calculated in real-time in the field. Additional time adjustment y may also be referred to as profile time adjustment t-profile-adj-R. In certain embodiments, DTP calibration data 144 stores t-tro-R, t-cm-adj-R, and t-profile-adj-R (additional time adjustment y) such that these DTP calibration parameters may be retrieved and used by the CMTS (see FIG. 8).

Figure 4:
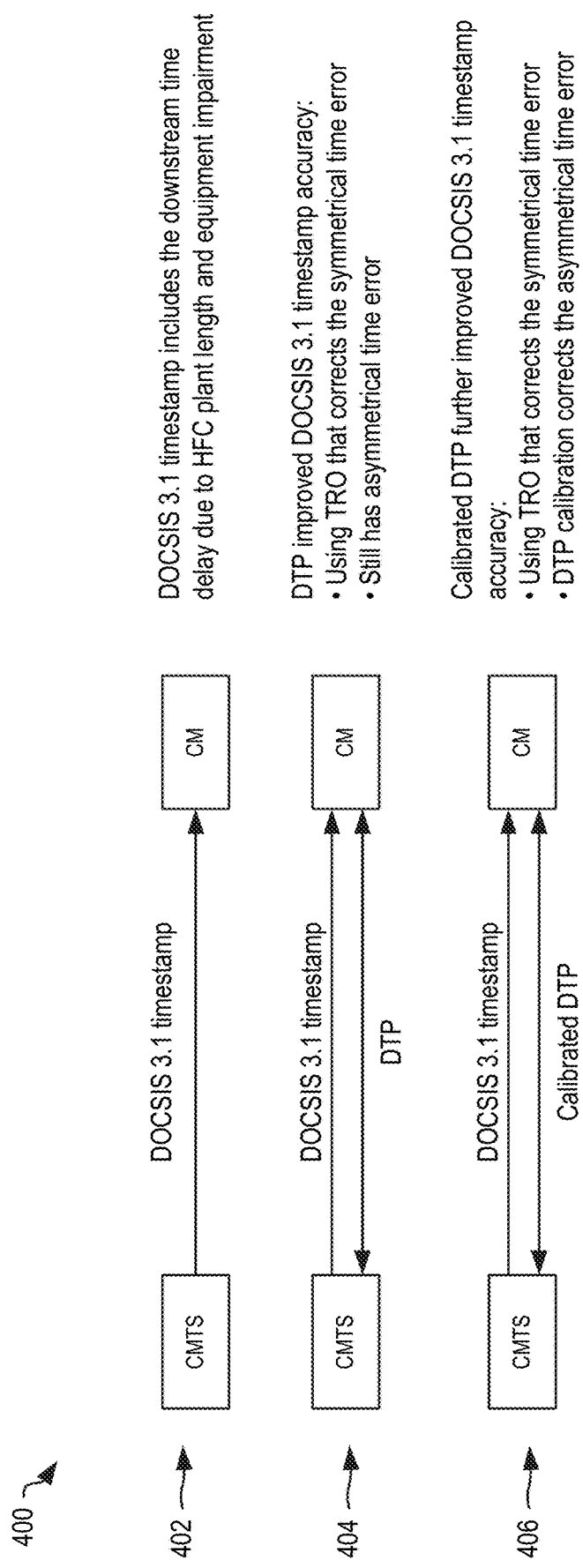
FIG. 4 shows a summary illustrating DOCSIS 3.1 timestamp transmission scenarios for a DOCSIS network that includes a DS delay, in embodiments.

FIG. 4 shows a summary 400 illustrating DOCSIS 3.1 timestamp transmission scenarios for a DOCSIS network that includes a DS delay. Scenario 402 represents transmission of the DOCSIS 3.1 timestamp without timing correction and thereby represents the greatest timing error. Scenario 404 uses DTP without calibration where TRO 216 is used to correct the symmetrical part of the DS delay. Scenario 406 uses DTP with calibration that further corrects the asymmetrical part of the DS delay. For example, DTP calibration reduces the time error from 3,223,800 ns (e.g., incurred by scenario 404) to 13-31 ns as reported in Section 8.4 of "DOCSIS Time Protocol Proof of Concept Phase I Technical Report CM-TR-DTP-V01-210915."

Figure 5:
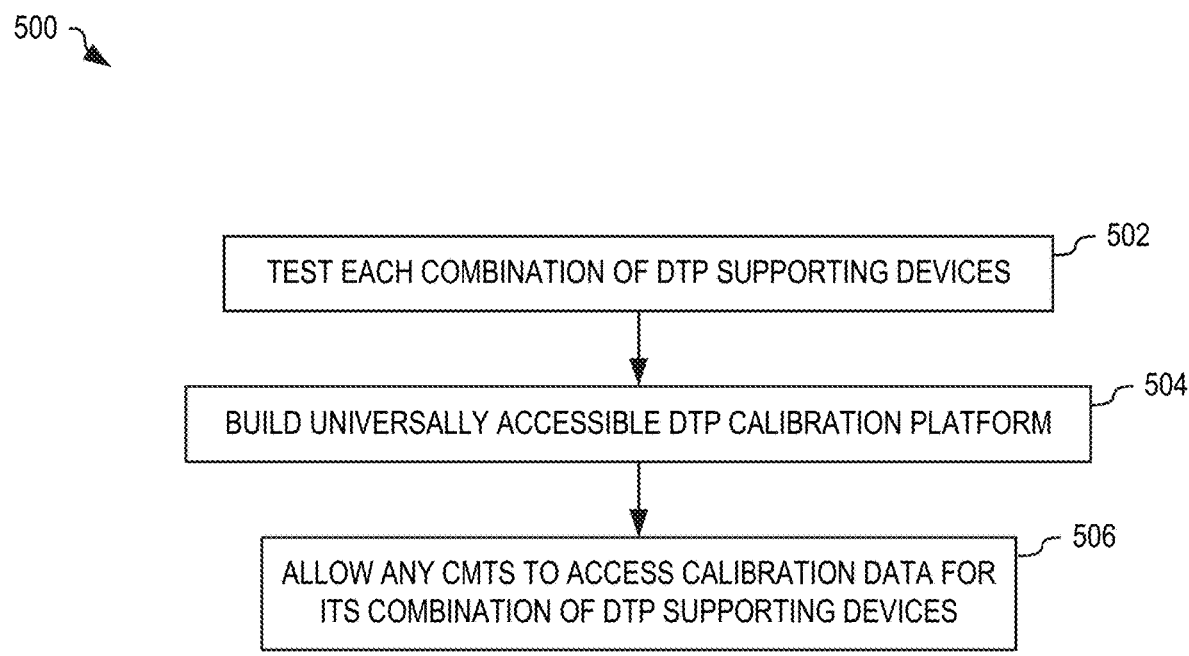
FIG. 5 is a flowchart illustrating one example method for implementing DTP calibration, in embodiments.

FIG. 5 is a flowchart illustrating one example method 500 for implementing DTP calibration. In block 502, method 500 tests each combination of DTP supporting devices to measure DTP timing errors and determine DTP calibration data (e.g., DTP calibration data 144). In one example of block 502, a lab determines DTP calibration data 144 for each different combination of CMTS 102, HFC 104 (e.g., RPD/RMD and/or amplifier 114), and CM 106. In block 504, method 500 builds a universally accessible DTP calibration platform (e.g., DTP calibration platform 130). In one example of block 504, cloud-based DTP calibration platform 130 is built. In block 506, method 500 allows any CMTS to access calibration data for its combination of DTP supporting devices. In one example of block 506, DTP calibration platform 130 includes API 150 configured to receive a request defining DTP calibration testing setup 142 from any CMTS 102, retrieve DTP calibration data 144 for the received DTP calibration testing setup 142, and return the DTP calibration data to the requesting CMTS. DTP calibration testing setup 142 may define one or more of PTP-to-DOCSIS interworking function (IWF) vendor Organization Unique Identifier (OUI), PTP-to-DOCSIS IWF model number, PTP-to-DOCSIS IWF hardware version, PTP-to-DOC- SIS IWF software version, PTP-to-DOCSIS IWF boot ROM version, CM vender OUI, CM model number, CM hardware version, CM software version, and CM boot ROM version. The PTP-to-DOCSIS IWF is a function that resides either in the CMTS or in the RPD/RMD to convert the PTP timestamp to a DOCSIS 3.1 timestamp. When the PTP-to-DOCSIS IWF resides in the CMTS, the network architecture is I-CMTS. When the PTP-to-DOCSIS IWF resides in RPD/RMD, the network architecture is DAA. Therefore, DTP calibration testing setup 142 also defines the network architecture. Each different combination of DTP supporting devices and CMTS operating configuration is uniquely represented by DTP calibration testing setup 142.

Timing measurement tests and determination of DTP calibration data 144 (e.g., block 502) may be conducted in at least one network timing test laboratory. For example, CableLabs/Kyrio has established a Network Timing Lab capable of evaluating DTP performance and determining corresponding DTP calibration data 144. A specific requirement of DTP calibration platform 130 is that it is universally accessible such that CMTS 102 may easily and reliably retrieve the appropriate DTP calibration data 144 for its determined configuration. Embodiments herein provide one example design for DTP calibration platform 130 using an API configured for Amazon Web Services (AWS). Advantageously, any CMTS may use API 150 to access DTP calibration platform 130 and retrieve DTP calibration data 144 for its determined configuration of DTP comparable devices in real-time. Using DTP calibration data 144 allows CMTS 102 to calculate timing offsets for CM 106 such that base station 108 is provided with an accurate (e.g., less than 1.5 µs timing error) DOCSIS 3.1 timestamp to operate 5G/4G radios.

Figure 6:
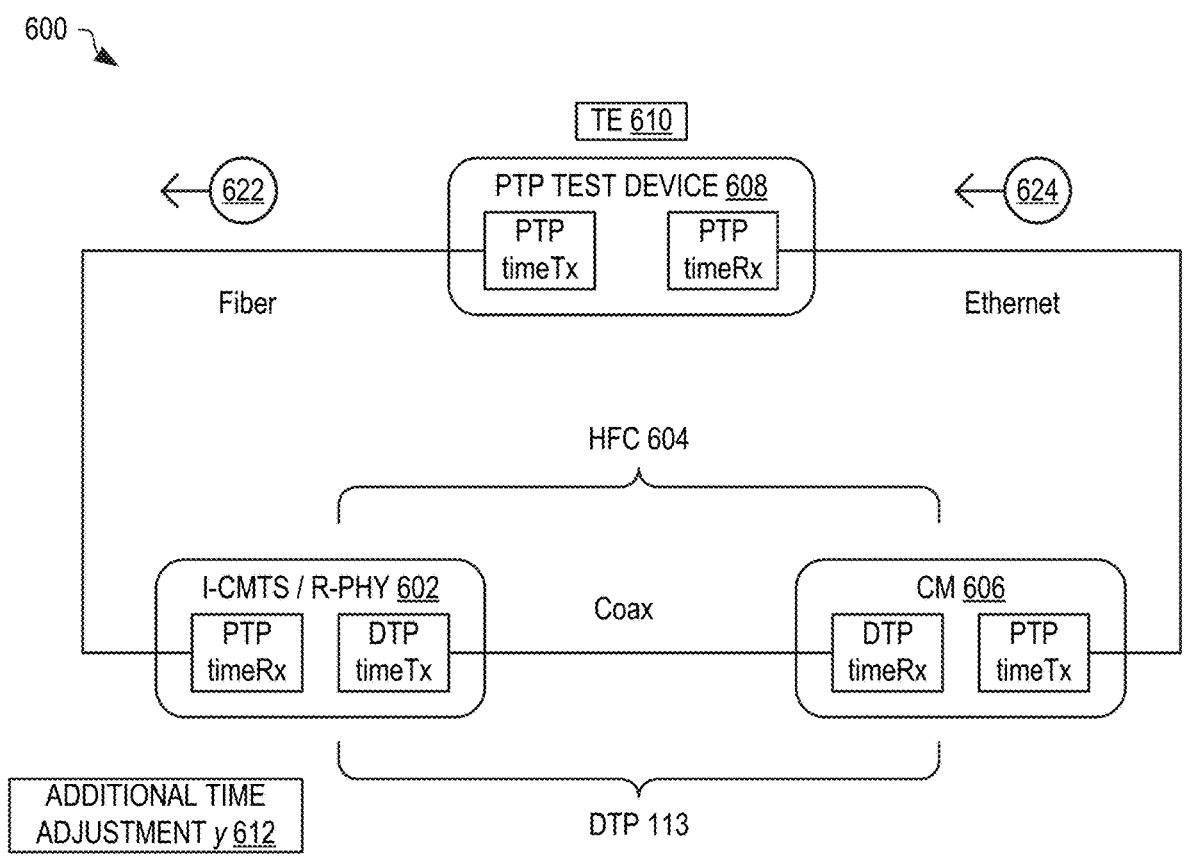
FIG. 6 shows one example lab configuration that uses a PTP test device to measure DTP timing errors over HFC between a DOCSIS Integrated CMTS/remote physical layer (I-CMTS/R-PHY) and a CM of a traditional network architecture, in embodiments.

FIG. 6 shows one example lab configuration 600 that uses a PTP test device 608 to measure DTP 113 timing errors over HFC 604 between a DOCSIS Integrated CMTS/remote physical layer (I-CMTS/R-PHY) 602 and a CM 606 of a traditional network architecture. Accordingly, lab configuration 600 is used when testing traditional network architecture configurations. PTP test device 608 is for example a Paragon-X test device by Calnex. I-CMTS/R-PHY 602 may represent CMTS 102 of FIG. 1 and CM 606 may represent CM 106 of FIG. 1. I-CMTS/R-PHY 602 and CM 606 thereby represent a combination of DTP supporting devices to be evaluated to determine DTP calibration data 144 for the derived DTP calibration testing setup 142 of I-CMTS/R-PHY 602 and CM 606.

PTP test device 608 cannot measure timing of DTP 113 directly-no DTP timing measurement device exists—and therefore, DTP timing measurements are based on PTP 111. Accordingly, PTP test device 608 is used to measure a timing error 610 between a first PTP timestamp 622 input to I-CMTS/R-PHY 602, and a second PTP timestamp 624 received from CM 606 as a result of first PTP timestamp 622 propagating through DTP 113 (e.g., over HFC 104). An additional time adjustment y 612 of I-CMTS/R-PHY 602 is then adjusted to minimize TE 610, repeating the measurement of TE 610 and adjusting of additional time adjustment y 612 as needed to stabilize TE 610. Additional time adjustment y 612 is then stored in calibration data repository 140 as DTP calibration data 144 (see DTP calibration results 812 of FIG. 8) in association with DTP calibration testing setup 142.

When a manufacturer releases a new product (e.g., CMTS or CM), or upgrades firmware within the product, each combination of DTP enabled devices using that device is (re)tested to determine the corresponding DTP calibration data 144.

Figure 7:
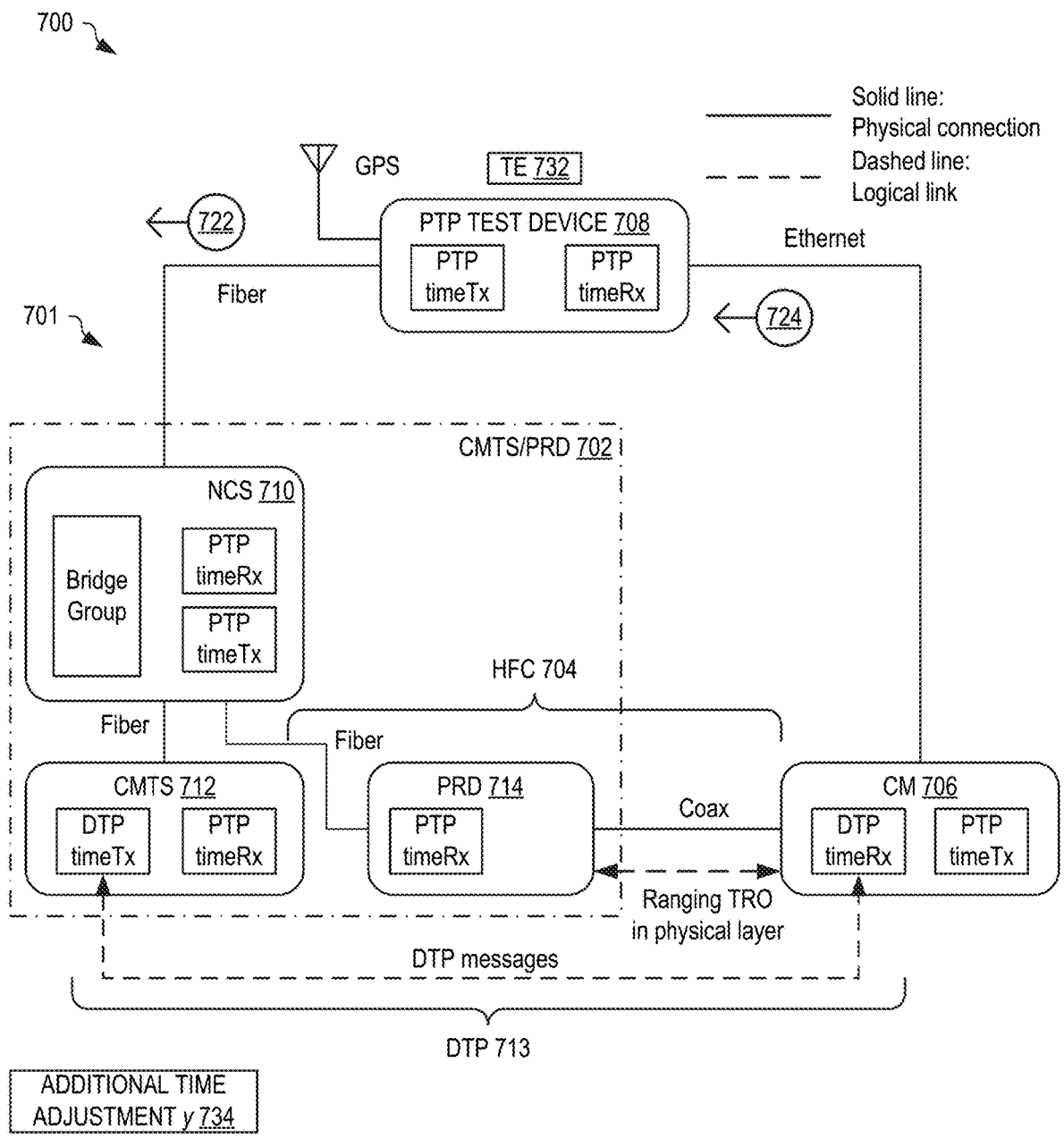
FIG. 7 shows one example lab configuration for measuring DTP timing errors in a timing signal using DTP for one example test configuration, in embodiments.

FIG. 7 shows one example lab configuration 700 for measuring DTP timing errors in a timing signal using DTP 713 for one example test configuration 701. Lab configuration 700 includes a CMTS/RPD 702, an HFC 704, a CM 706, and a PTP test device 708. In this example, CMTS/RPD 702 is a Distributed Access Architecture (DAA) that includes a Network Convergence System (NCS) 710, a CMTS 712, and an RPD 714. Accordingly, lab configuration 700 is used for testing DAA type network architectures. CMTS/RPD 702, HFC 704, and CM 706 thereby represent a particular combination of DTP enabled devices identified by a configuration hash (e.g., DTP calibration testing setup 142) being evaluated to determine DTP calibration data 144 for that particular combination and configuration of devices.

A PTP test device 708 connects to NCS 710 via a first fiber link, and to CM 706 via an Ethernet link measures a PTP TE 732 in lab configuration 700 (e.g., test configuration 701). In one embodiment, PTP test device 708 is a Paragon-X test device from Calnex, CMTS 712 is an integrated CMTS such as Cisco cBR-8, RPD 714 is a Remote-PHY device such as Cisco SmartPHY 120, CM 706 is a Hitron ODIN1112, and NCS 710 is a Cisco Network Convergence System that is a switch connecting other devices and includes a boundary clock.

PTP test device 708 measures PTP TE 732 between a first DOCSIS timestamp 722 input to CMTS/RPD 702 and a second DOCSIS timestamp 724 received from CM 706, where second DOCSIS timestamp 724 results from propagation of first DOCSIS timestamp 722 through test configuration 701. PTP TE 732 is then used to determine an additional time adjustment y 734 that is used by CMTS 712 to adjust the error in CM 706 and thereby increase timing accuracy of second DOCSIS timestamp 724. An additional time adjustment y 734 of CMTS 712 is then adjusted to minimize TE 732, repeating the measurement of TE 732 and adjusting of additional time adjustment y 734 as needed to stabilize TE 732. Additional time adjustment y 734 is then stored in calibration data repository 140 as DTP calibration data 144 in association with DTP calibration testing setup 142.

When a manufacturer releases a new product (e.g., CMTS, RPD or CM), or upgrades firmware within the product, each combination of DTP enabled devices using that device is (re)tested to determine the corresponding DTP calibration data 144.

Data Structure

Figure 8:
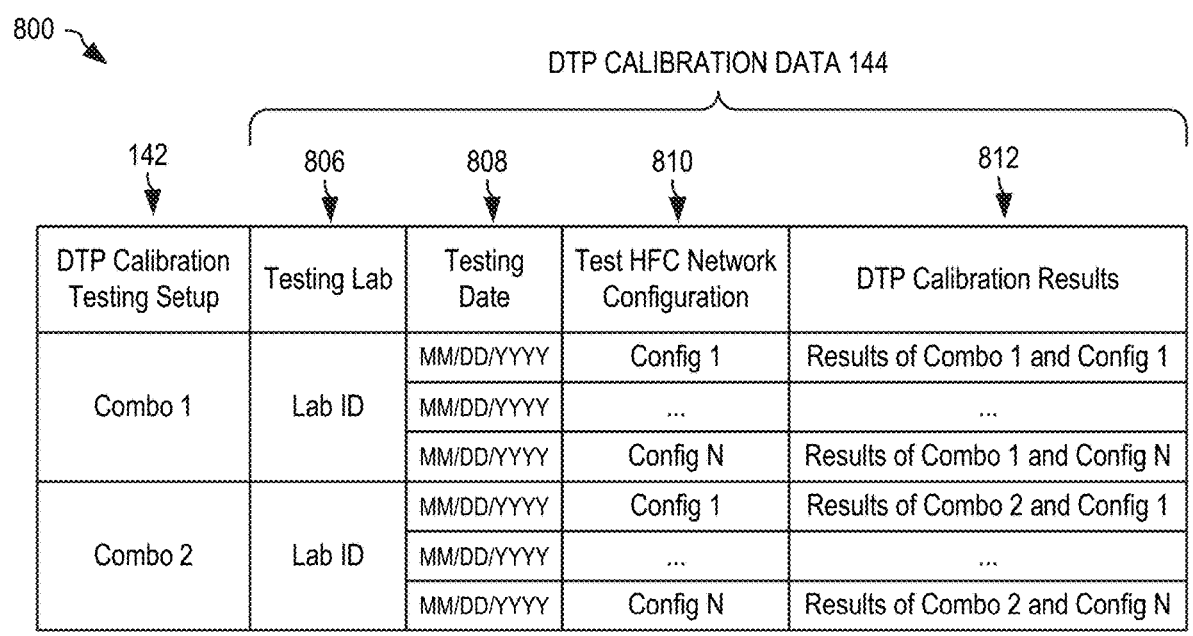
FIG. 8 is a block diagram illustrating example table data structure of calibration data repository of FIG. 1, in embodiments.

FIG. 8 is a block diagram illustrating example table data structure 800 of calibration data repository 140 of FIG. 1. Table data structure 800 has five columns: DTP calibration testing setup 142, testing lab 806, testing date 808, test HFC network configuration 810, and DTP calibration results 812. DTP calibration testing setup 142 defines hardware and firmware versions of DTP enabled devices within DOCSIS network 100 and may include one or more of PTP-to-DOCSIS IWF vendor OUI, PTP-to-DOCSIS IWF model number, PTP-to-DOCSIS IWF hardware version, PTP-to-DOCSIS IWF software version, PTP-to-DOCSIS IWF boot ROM version, CM vender OUI, CM model number, CM hardware version, CM software version, and CM boot ROM version. DTP calibration data 144 includes testing lab 806, testing date 808, test HFC network configuration 810, and DTP calibration results 812.

DTP may be deployed on a traditional network with I-CMTS and on a distributed access architecture (DAA)

network. DAA also includes remote-PHY and remote-MACPHY. In certain embodiments, network architecture 802 is represented by two bits. Hardware & firmware combinations 804 include make, hardware version and firmware version of each I-CMTS chassis, I-CMTS line card, RPD (for DAA only), and CM in test configuration 701 and DOCSIS network 100.

Testing lab 806 identifies the laboratory that determined DTP calibration data 144 for the defined DTP calibration testing setup 142 and testing date 808 is the date when the test was conducted. Test HFC network configuration 810 may include one or both of US channel used for TRO measurement and DS modulation scheme. DTP calibration results 812 includes the asymmetrical calibration values t-tro-R, t-cm-adj-R, and t-profile-adj-R (additional time adjustment y) that the CMTS sends to the CM to correct the timing error caused by the CMTS and CM hardware/software design. In certain embodiments, the DS cyclic prefix may be removed from the Cal-data Response message if it is proved that it does not impact the DTP performance.

DTP Calibration Platform Design

AWS was selected as the cloud provider for DTP calibration platform 130 as the most mature and enterprise-ready provider. However, other providers and solutions may be used without departing from the scope hereof. For example, DTP calibration platform 130 may be implemented on a server located at the testing laboratory.

Figure 9A:
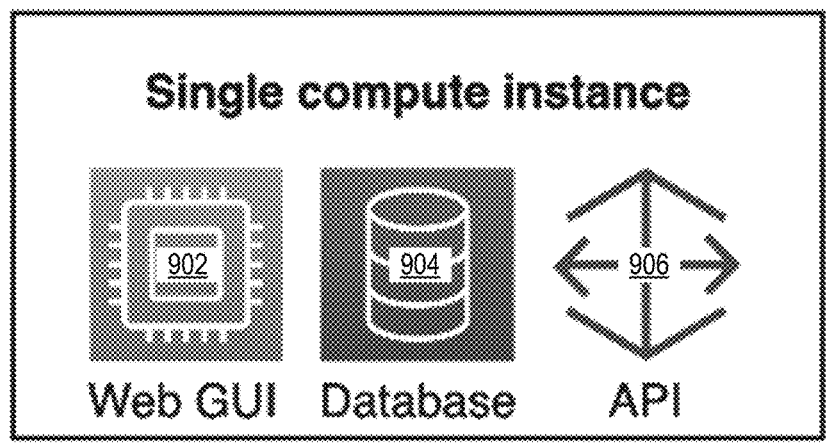
FIGS. 9A-9C shows three possible designs to implement a web GUI, a database, and an API in the cloud with varying levels of modularity, in embodiments.
Figure 9B:
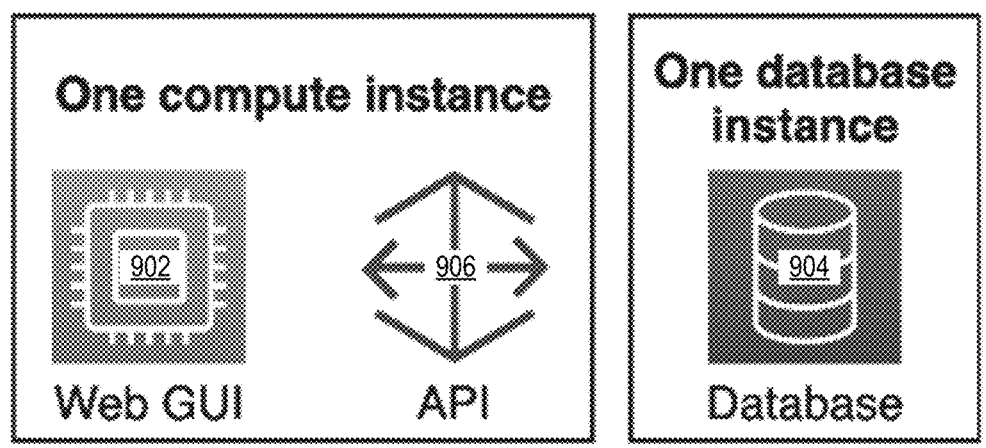
Figure 9C:
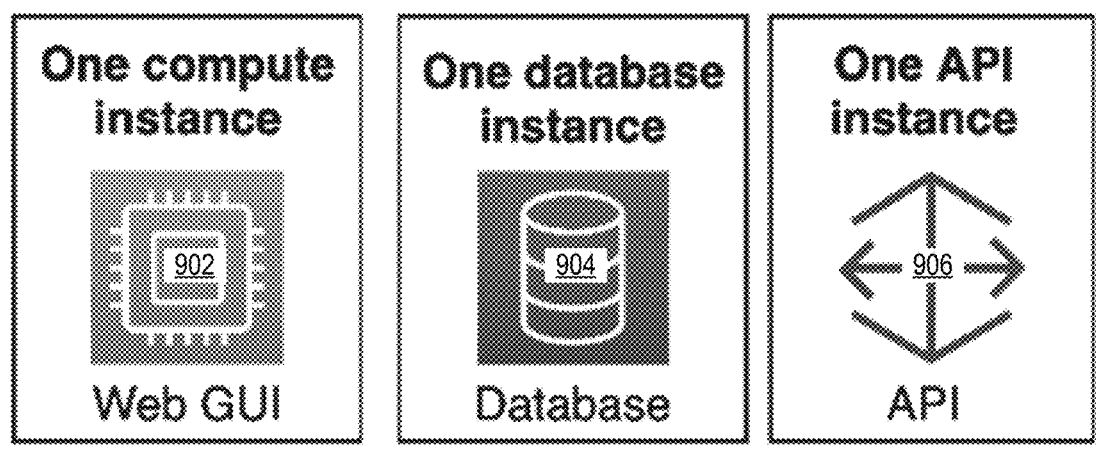

AWS provides multiple different methods to implement the abovementioned three components depending on the amount of modularity required in the system design. FIGS. 9A-9C shows three possible designs to implement a web GUI 902, a database 904, and an API 906 in AWS with varying levels of modularity. Database 904 may implement calibration data repository 140 of FIG. 1 and API 906 may implement API 150. FIG. 9A illustrates a single compute instance 900 implementing the three components. While this approach provides vertical scaling capabilities, it offers limited flexibility and availability benefits. In FIG. 9B, database is transitioned out to its own module (database instance 930) while the web GUI and API reside on single compute instance 900. Disaggregating the database offers added benefits of leveraging a database management system to abstract away the setup, operation, and scaling tasks. In FIG. 9C, all three components are implements in their own module (one compute instance 900, one database instance 930, and one API instance 960). This approach provides the most modularity in terms of allowing independent management and innovation of each component while hiding the complexity of each part behind an abstraction and interface.

Figure 10:
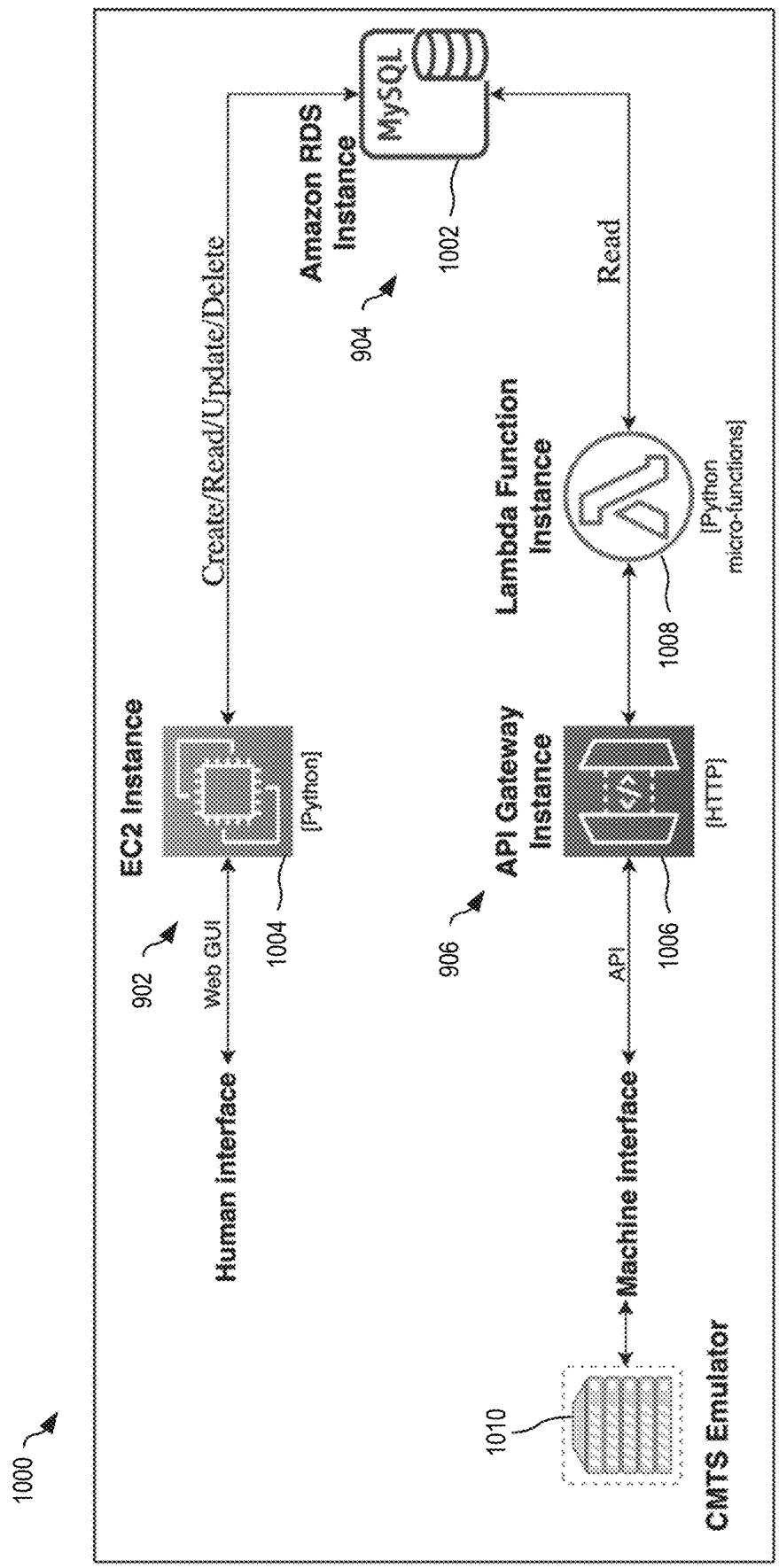
FIG. 10 shows an example framework of DTP calibration platform implemented on AWS, in embodiments.

FIG. 10 shows an example framework 1000 of DTP calibration platform 130 implemented on a cloud-based processing environment. For example, the cloud-based processing environment may be Amazon Web Services (AWS), Google Cloud Platform (GCP), or the like. The following discussion references AWS-based products, but it should be appreciated that similar products could be implemented on other cloud-based processing environments. Database 904 is hosted using Amazon Relational Database Service (RDS) 1002, web GUI 902 is running on an Elastic Compute Cloud (EC2) instance 1004, and API 906 includes Amazon API Gateway 1006 as the frontend and AWS Lambda service 1008 as the backend. To validate the end-to-end functionality of the cloud application, a CMTS emulator 1010 was developed to test sending requests and receiving responses from the cloud application.

Since the structure of the data to be stored in calibration data repository 130 is not expected to change frequently, a relational database was selected as the database type. Amongst the different relational database engines available, MySQL was chosen as it is open-source and provides sufficient flexibility to run on any operating system. A Python script was developed to instantiate and create the database schema allowing for any possible changes in the future. Database reliability may be enhanced by utilizing the RDS Multi-AZ (Availability Zone) functionality provided by AWS wherein a standby database instance is automatically created in another AZ and data is synchronously replicated between the two instances.

Web GUI 902 may be implemented in Python using Flask. Flask was selected as the web framework as it allows for easy addition of libraries or plugins for an extension and comes with a built-in development server and fast debugger. Additional modules for handling forms and enabling login using username and passwords were implemented using Flask extensions. Web GUI 902 provides the user with the capability to add new calibration entries to the database, read existing entries from the database, update existing entries in the database, and delete any existing entry from the database.

AWS offers two types of API Gateways-HTTP-based and websocket-based. HTTP APIs were selected as the API Gateway type since the communication between any CMTS and DTP calibration platform 130 is expected to be stateless and not based on stateful real-time two-way communication applications such as chat apps or streaming dashboards which require websocket APIs. Amazon's HTTP API Gateway provides API proxy functionality and low-latency, cost-effective integrations with other AWS services. Both HTTP GET and POST methods are implemented to enable sending query parameters via the URL of the GET request and the request body of the POST message. Since the connection between the CMTS and the cloud application is not expected to be persistent and would be infrequent (only when there is a new configuration pairing of CMTS-CM), the API backend also does not require persistent compute. Therefore, serverless Lambda functions are used in the API backend to consume compute resources only when needed (e.g., when an incoming request is a received from a CMTS). The API Gateway is configured to pass the query/payload received from the client to the Lambda function and return the function's response to the client. A Lambda function is developed to run a database read query based on the received query/payload parameters (CMTS-CM Hardware-Firmware versions) and return the result (timing parameters) along with a valid HTTP status code.

CMTS emulator 1010 may include an API client that tests the responses of the cloud application by sending HTTP requests to the API Gateway with different Hardware-Firmware combinations. The content-type is set to application/JSON for these requests and responses. JSON is used as the payload format as it is lightweight and is suitable for both human reading and machine parsing. The motivation behind developing this emulator is to demonstrate the work needed by CMTS vendors to enable the remote collection of timing parameters from the cloud application.

The current application design also supports adding calibration entries, in addition to reading them, using the API Gateway and Lambda function framework. This would allow automation in the calibration process wherein a large number of timing entries could be added in the database without requiring manual work. Application security is considered at two levels: (i) API level: Access to the API can be restricted by either using HTTP request parameters-based authorization (such as username/password) or by using token-based authorization (such as JSON Web Token, JWT), and (ii) Network level: Access to the virtual network where the API framework is hosted can be restricted to known CMTS IP addresses only.

DTP Calibration Platform API Design

Figure 11:
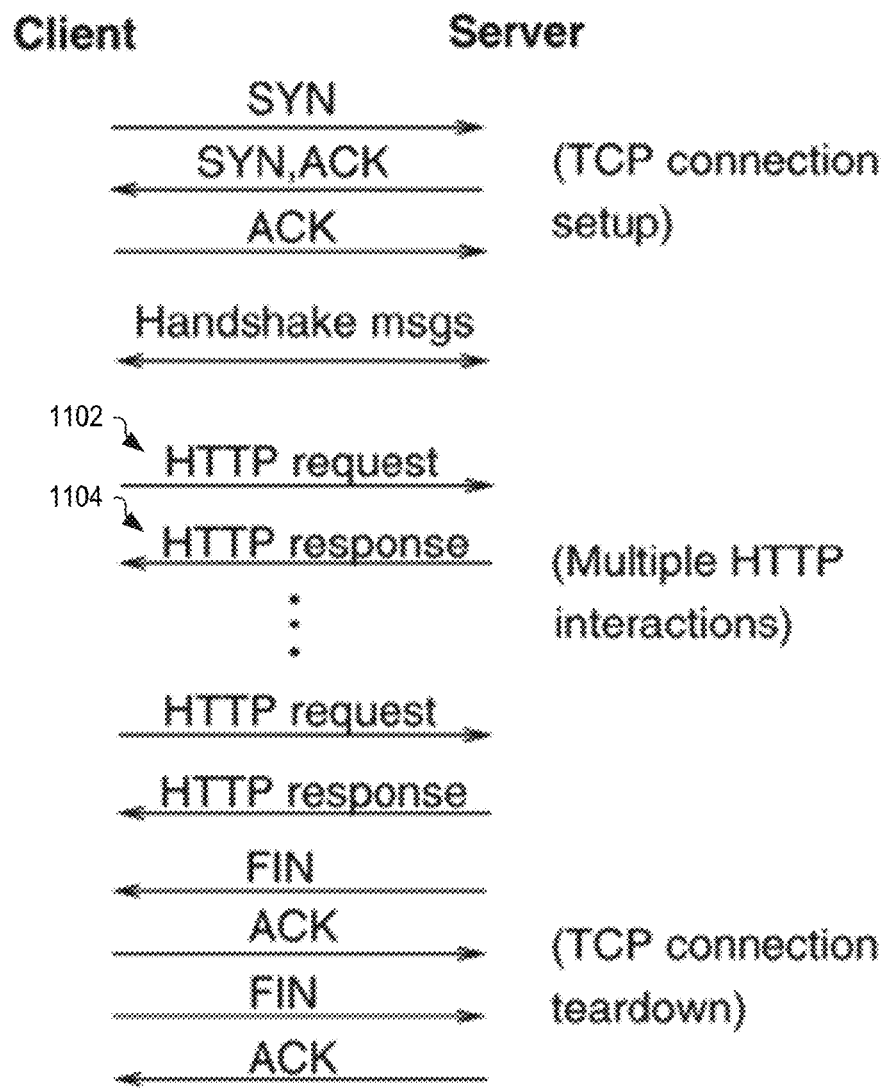
FIG. 11 is a data flow diagram illustrating HTTP-based message flow between the AWS server and CMTS, in embodiments.

FIG. 11 is a data flow diagram illustrating HTTP-based message flow 1100 between the AWS server and CMTS. HTTP uses TCP as transport layer to provide reliable network transmission using acknowledgments. Accordingly, API 150 uses "HTTP request" 1102 and "HTTP response" 1104 to exchange information between the CMTS and AWS server. The CMTS (client) sends a Cal-data Request to the server that is contained in HTTP Request 1102. Cal-data Request only includes DTP calibration testing setup 142 that defines the network architecture and hardware and firmware versions of the combination of DTP enabled devices. Cal-data Response message includes both DTP calibration testing setup 142 and DTP calibration data 144 (see FIG. 8). The server sends Cal-data Response to the client that is contained in the HTTP Response 1104 and includes DTP calibration data 144, described above.

In one example of operation, the client (e.g., CMTS 102) sets a timer (e.g., 500 ms) using a status code when sending the Cal-data Request message. The client checks the status code and the received calibration data. If failure, the client may resend the Cal-data Request message. The AWS server may provide multiple IP addresses for redundancy, and the client may try another server IP address when receiving over five consecutive failures. DTP calibration platform 130 may indicate three failure reasons: 1) timer expired; 2) network architecture and Hardware/Firmware combinations do not match an entry within calibration data repository 140; and 3) calibration data (test configurations or measured time error results) are incomplete.

Figure 12:
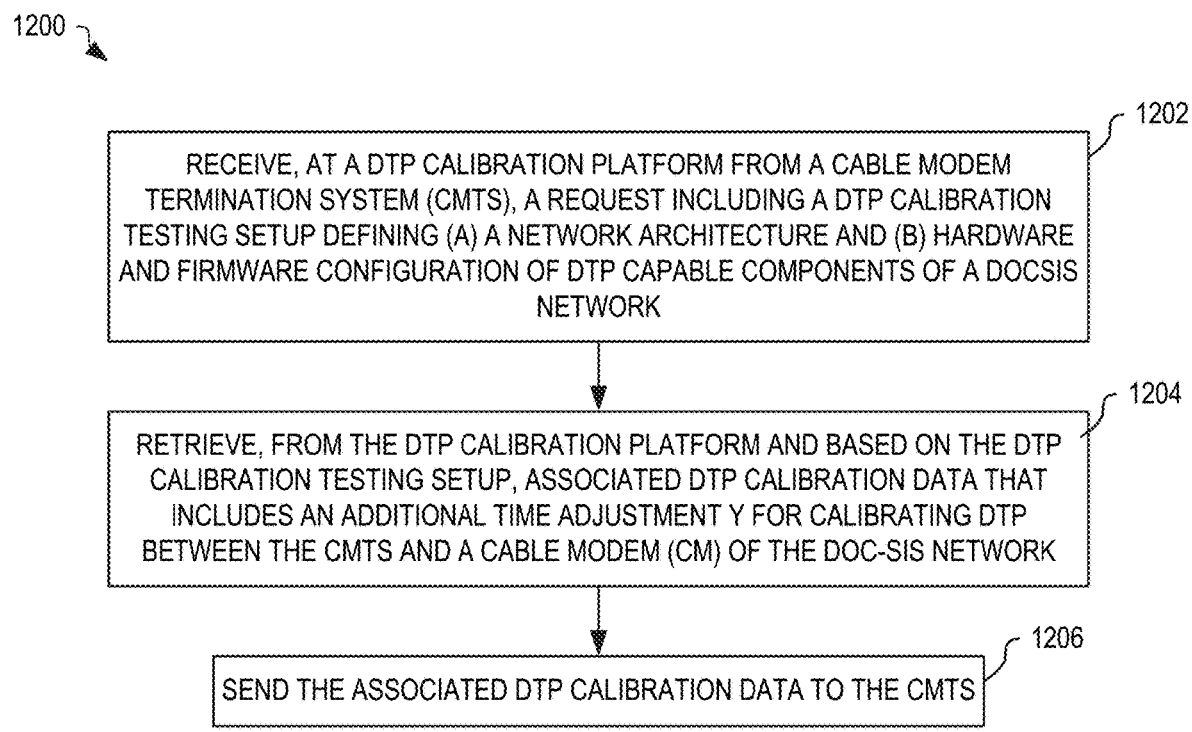
FIG. 12 is a flowchart illustrating one example DTP calibration method, in embodiments.

FIG. 12 is a flowchart illustrating one example DTP calibration method 1200. Method 1200 is implemented in DTP calibration platform 130 for example. In block 1202, method 1200 receives, at a DTP calibration platform from a cable modem termination system (CMTS), a request including a DTP calibration testing setup defining (a) a network architecture and (b) hardware and firmware configuration of DTP capable components of a DOCSIS network. In one example of block 1202, DTP calibration platform 130 receives request 162, including DTP calibration testing setup 142, from CMTS 102. In block 1204, method 1200 retrieves, from the DTP calibration platform and based on the DTP calibration testing setup, associated DTP calibration data that includes an additional time adjustment y for calibrating DTP between the CMTS and a cable modem (CM) of the DOC-SIS network. In one example of block 1204, DTP calibration platform 130 retrieves DTP calibration data 144 from calibration data repository 140 based on DTP calibration testing setup 142. In block 1206, method 1200 sends the associated DTP calibration data to the CMTS. In one example of block 1206, DTP calibration platform 130 sends response 164, including DTP calibration data 144, to CMTS 102 such that CMTS 102 may apply additional time adjustment y 612/734 to calibrate DTP between CMTS 102 and CM 106.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A cloud-based Data-Over-Cable Service Interface Specification (DOCSIS) time protocol (DTP) calibration method, comprising:
    receiving, at a DTP calibration platform from a cable modem termination system (CMTS), a request including a DTP calibration testing setup defining (a) a network architecture and (b) hardware and firmware configuration of DTP capable components of a DOCSIS network;
    retrieving, from the DTP calibration platform and based on the DTP calibration testing setup, associated DTP calibration data that includes an additional time adjustment y for calibrating DTP between the CMTS and a cable modem (CM) of the DOCSIS network; and
    sending the associated DTP calibration data to the CMTS.

2. The method of claim 1, further comprising, prior to the step of receiving:
    measuring a DTP timing error for a test configuration representative of the DOCSIS network;
    adjusting the additional time adjustment y to minimize the DTP timing error; and
    storing the associated DTP calibration data including the additional time adjustment y in association with the DTP calibration testing setup in the DTP calibration platform.

3. The method of claim 1, wherein the DTP calibration platform includes an application programming interface (API) having an API framework for interacting with the CMTS.

4. The method of claim 1, the DTP being implemented over a hybrid fiber-coaxial (HFC) plant of the DOCSIS network.

5. The method of claim 1, the additional time adjustment y being applied to a true ranging offset dynamically determined by the CM.

6. The method of claim 1, the network architecture being one of (c) a traditional network where the CMTS is an integrated CMTS and (d) a Distributed Access Architecture (DAA) that includes a Network Convergence System (NCS) and a remote physical layer device (RPD).

7. The method of claim 1, the CMTS being a virtual CMTS.

8. A cloud-based Data-Over-Cable Service Interface Specification (DOCSIS) time protocol (DTP) calibration method, comprising:
    determining, at a cable modem termination system (CMTS), a DTP calibration testing setup of a DOCSIS network, the DTP calibration testing setup defining (a) a network architecture and (b) hardware and firmware configuration of DTP capable components of the DOCSIS network;
    sending a request including the DTP calibration testing setup to a DTP calibration platform;
    receiving, from the DTP calibration platform based on the DTP calibration testing setup, DTP calibration data including an additional time adjustment y; and
    sending the additional time adjustment y to a cable modem (CM) of the DOCSIS network, wherein the additional time adjustment y calibrates DTP between the CMTS and the CM.

9. The method of claim 8, the network architecture being one of (c) a traditional network where the CMTS is an integrated CMTS and (d) a Distributed Access Architecture (DAA) that includes a Network Convergence System (NCS) and a remote physical layer device (RPD).

10. The method of claim 8, the CMTS being a virtual CMTS.

11. The method of claim 8, the steps of sending and receiving using an application programming interface (API) of the DTP calibration platform, the API having an API framework for interacting with the CMTS.

12. The method of claim 8, the DTP being implemented over a hybrid fiber-coaxial (HFC) plant between the CMTS and the CM.

13. The method of claim 8, the DTP calibration data further comprising a test hybrid fiber-coaxial (HFC) network configuration defining one or both of an upstream channel used for TRO measurement and a downstream cyclic prefix.

14. A Data-Over-Cable Service Interface Specification (DOCSIS) time protocol (DTP) calibration data platform, comprising:
- a calibration data repository storing DTP calibration data in association with a DTP calibration testing setup defining (a) a network architecture and (b) hardware and firmware configuration of DTP capable components of a DOCSIS network;
- an application programming interface (API) having an API framework responsive to send the DTP calibration data to a cable modem termination system (CMTS) in response to a request defining the DTP calibration testing setup of the DOCSIS network; and
- a graphical user interface (GUI) providing a means for updating the calibration data repository.

15. The platform of claim 14, the calibration data repository, the API, and the GUI being implemented using Amazon Web Services (AWS).

16. The platform of claim 14, the DTP calibration data comprising an additional time adjustment y for calibrating DTP between the CMTS and a cable modem (CM) of the DOCSIS network.

17. The platform of claim 16, the DTP calibration data further comprising an identifier of a laboratory that determined the additional time adjustment y and a testing date indicative of when the additional time adjustment y was determined.

18. The platform of claim 16, the DTP calibration data further comprising a test hybrid fiber-coaxial (HFC) network configuration defining one or both of an upstream channel used for TRO measurement and a downstream cyclic prefix.

19. A Data-Over-Cable Service Interface Specification (DOCSIS) time protocol (DTP) calibration method, comprising:
- measuring, in a testing laboratory, a DTP timing error for a test configuration representative of a DOCSIS network to determine DTP calibration data;
- storing the DTP calibration data in association with a DTP calibration testing setup of the DOCSIS network in a DTP calibration platform; and
- applying, by an operational cable modem termination system (CMTS) conforming to the DTP calibration testing setup, the DTP calibration data retrieved from the DTP calibration platform based on the DTP calibration testing setup.

* * * * *